July 14, 1931.    C. H. KLEIN    1,813,933
WIRE SUPPORT
Filed Jan. 25, 1930
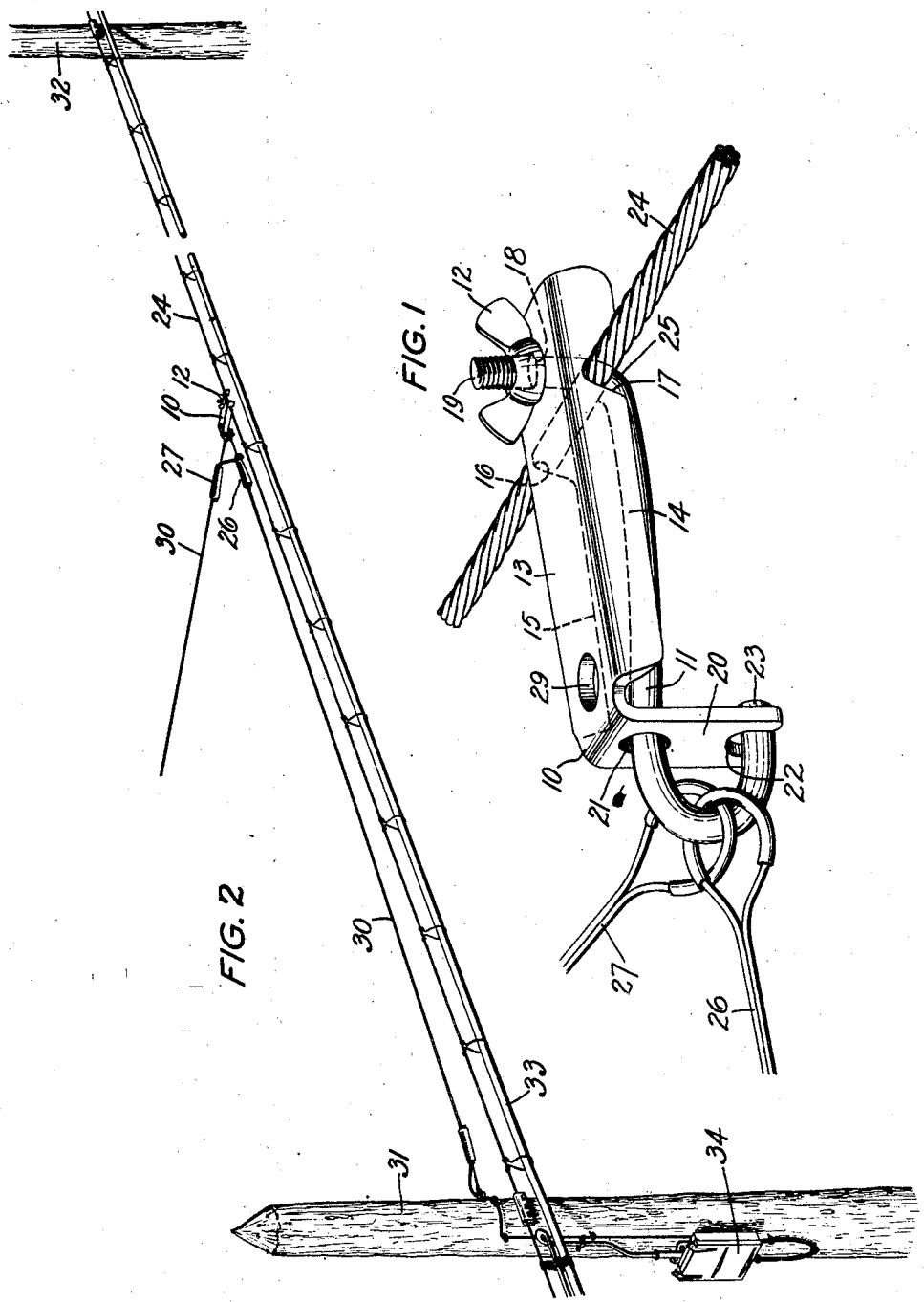
INVENTOR
C. H. KLEIN
BY J. MacDonald
ATTORNEY

Patented July 14, 1931

1,813,933

UNITED STATES PATENT OFFICE

CHARLES H. KLEIN, OF RUTHERFORD, NEW JERSEY, ASSIGNOR TO BELL TELEPHONE LABORATORIES, INCORPORATED, OF NEW YORK, N. Y., A CORPORATION OF NEW YORK

WIRE SUPPORT

Application filed January 25, 1930. Serial No. 423,506.

This invention relates to supports for wires and more particularly to supports for drop wires which extend from a messenger strand to a subscriber's station.

The object of the invention is to provide an improved supporting device which will not only be strong and durable, but will effect a saving in the cost of manufacture and installation.

In accordance with the preferred form of the present invention, the support or clamp is constructed of suitable metal and comprises a body member, a hook member, one end of which is threaded, and a securing means. The body comprises an elongated member the edges along its length being bent downward at an angle approximately 60° with respect to the face or flat portion of said member. Extending downwardly at right angles to said body and located at one end is an ear, the length of which is approximately ⅓ the length of the body member. Located in the edges and adjacent the opposite end of the support are a pair of V-shaped slots which extend approximately ¾ the distance into said downward extending edges. Adjacent said slots and located in the face of the body member is an aperture which is arranged to accommodate the threaded end of the hook member which is arranged to be held therein by means of a wing nut. Located in the ear portion of the support and close to the body of said support is an aperture through which the bent portion of the hook passes. On the bottom edge of the ear and in alignment with said aperture and extending part way into said ear is a slot in which the free end of the hook lies.

In operation the messenger or supporting wire is seated in the V-shaped slots and is rigidly held in place by the clamping action of the threaded end of the hook portion which forces the strand into engagement with the body member of the support. The opposite or free end of the hook is now held rigidly in place and provides a support for wire attachments, for example, the attachment shown in Patent No. 1653840 to G. N. Byl dated December 27, 1927, which may be readily slipped through the slot at the bottom of the ear and into engagement with the free end of the hook.

The above construction provides a support which while not large or cumbersome will stand a great amount of strain and adapts itself readily to various wire attaching means.

Referring now to the drawings,

Fig. 1 is a perspective view of applicant's improved support secured to a fragment of supporting wire.

Fig. 2 is a perspective view of applicant's support as secured to a messenger strand on a telephone line.

Referring now to Fig. 1 applicant's improved support comprises three members, namely, a body member 10, a hook member 11 and a securing means 12, all of which are formed out of suitable metal, such as mild steel, and of such proportions that they will stand a substantial amount of strain.

The body portion 10 is formed out of one piece of metal and comprises a face or flat portion 13, the edges 14 and 15 of which are bent downward at approximately 60° with respect to the face 13. Located adjacent one end of the support are V-shaped slots 16 and 17. Adjacent said slots and located in the face 13 of the body member 10 is an aperture 18 through which the threaded end 19 of the hook 11 is adapted to pass and is secured therein by means of the wing nut 12. On the opposite end of the body portion 10 is an ear 20 which has provided therein an aperture 21 and a slot 22, the free end 23 of the hook 11 being arranged to pass through the aperture 21 and lie in the slot 22.

In assembling the device for use, the free end 23 is first inserted into the aperture 21, with the threaded end 19 of the hook 11 hanging free. In this position the body portion 10 is placed over the messenger or supporting strand 24 so that the strand 24 is seated in the V-shaped slots 16 and 17. The threaded end 19 is now inserted through the aperture 18 with the portion 25 of the hook member 11 bearing against the underside of the strand 24. The wing nut 12 is now positioned and screwed down on the threaded end 19, thus drawing the hook 11 into firm engagement with the strand 24. The free end 23 is now rigidly held in the slot 22 and at the same time the support is firmly secured to the strand 24. The device is now ready for the wire attachments 26 and 27 to be attached thereto by slipping them thru the slot 22 into engagement with the free end 23 of the hook 11. Any suitable wire attachments may be used, but for the purpose of illustration applicant has disclosed his support used in combination with the attachment shown in Patent No. 1653840 to G. N. Byl dated December 27, 1927, which adapts itself very readily for use with the applicant's device.

When it is desired to secure a porcelain knob or similar device (not shown) to the support, it may be secured through the aperture 29, by means of a bolt.

As shown in Fig. 2 applicant's support is particularly useful when it is desired to run a telephone line 30 from a point mid-way between the poles 31 and 32 to a subscriber's station (not shown). For example, when it is necessary to parallel the cable 33 for a short distance, as is often the case when various obstructions, such as houses and trees interfere with the running of the wire direct from the cable terminal box 34 to the subscriber's station, (not shown).

It is readily apparent that when the messenger strand 24 is inserted between the hook 11 and the V slots 16 and 17 and the wing nut 12 screwed down a very strong and substantial union is made due to the hook 11 putting a kink in the strand 24 at a point midway between the edges 14 and 15.

While there is shown and described herein the preferred embodiment of the invention, it is understood that it is not limited or confined to the precise details of construction herein disclosed, as modifications and variations may be made without departing from the spirit of the invention.

What is claimed is:

1. A wire support comprising a body member, a hook member, and a securing means, one end of said body member having an ear projecting therefrom, an aperture and a slot in said ear and an aperture in said body member, said hook extending through said apertures and positioned in said slot, said hook being rigidly held by said securing means.

2. A wire support comprising a body member, a threaded hook member and a securing means, an ear projecting from one end of said body member and having an aperture and a slot therein in which the free end of the hook is positioned, and an aperture in said body member through which the threaded end of the hook projects and is engaged by said securing means.

3. A support for wires and the like comprising a body member, a hook member and a securing means, said body member having flanges along its length, and a projecting ear at one end, slots in said ear and in said flanges, an aperture in said ear and in said body member through which the hook member passes and is secured therein by said securing means.

In witness whereof, I hereunto subscribe my name this 23 day of January 1930.

CHARLES H. KLEIN.